Jan. 30, 1968    J. R. RISTOW    3,366,076
SWITCH FOR TROLLEYS OF OVERHEAD CONVEYOR
Filed Nov. 19, 1965    3 Sheets-Sheet 1
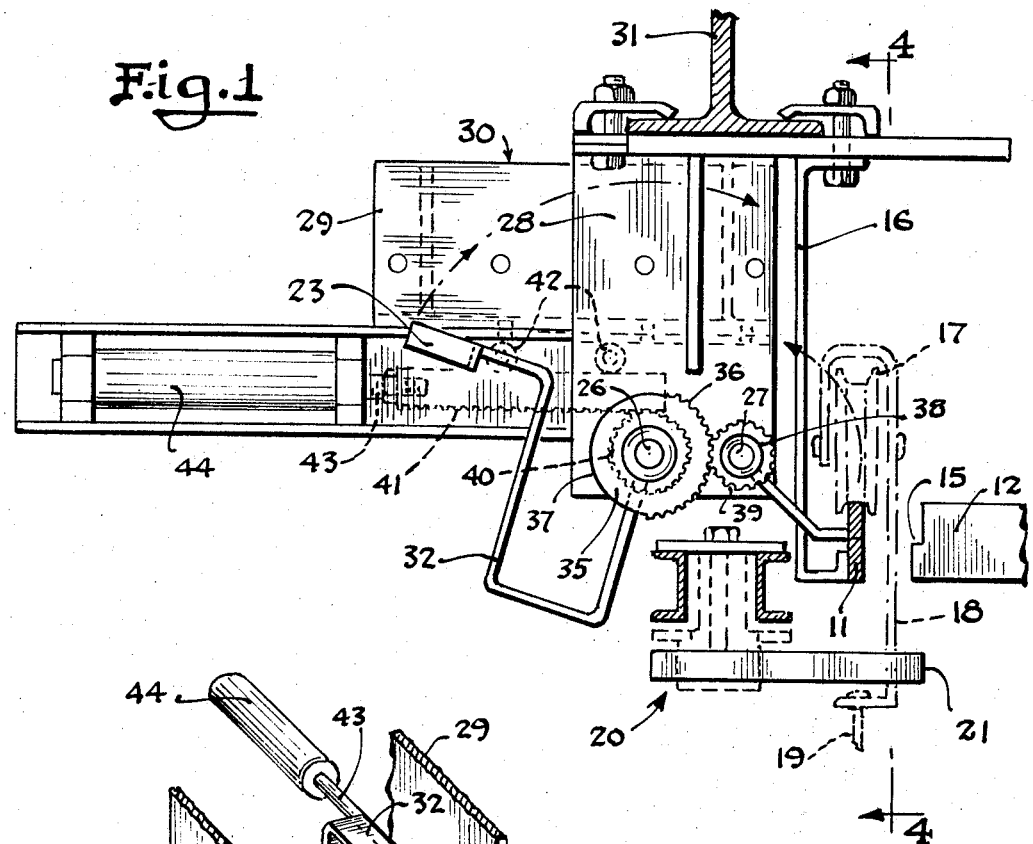
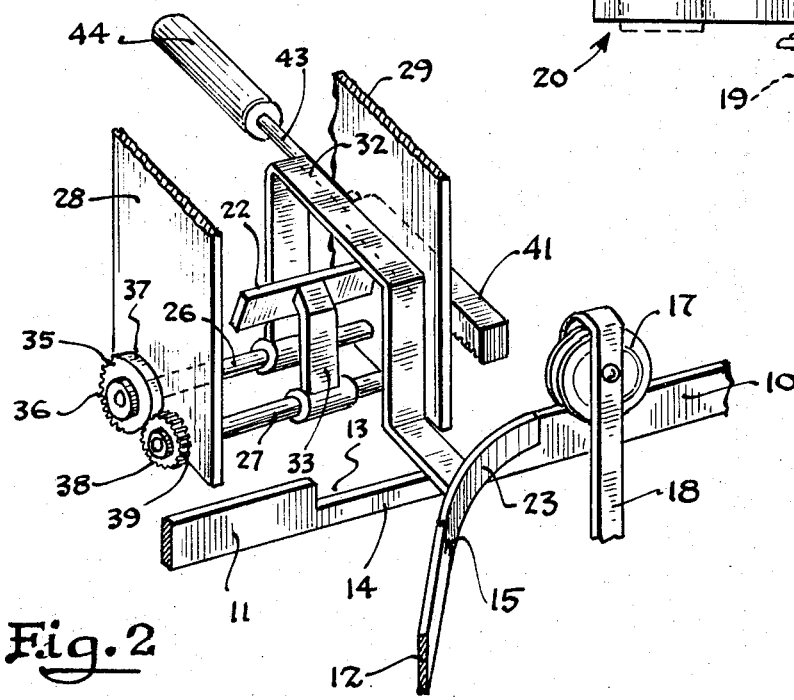
Inventor
John R. Ristow
By Darbo, Robertson & Vandenburgh
Attorneys

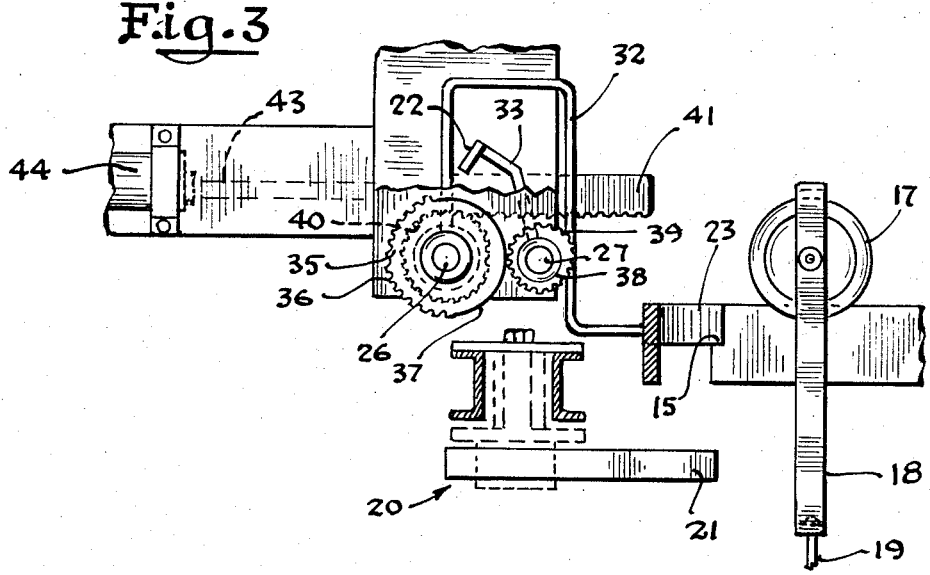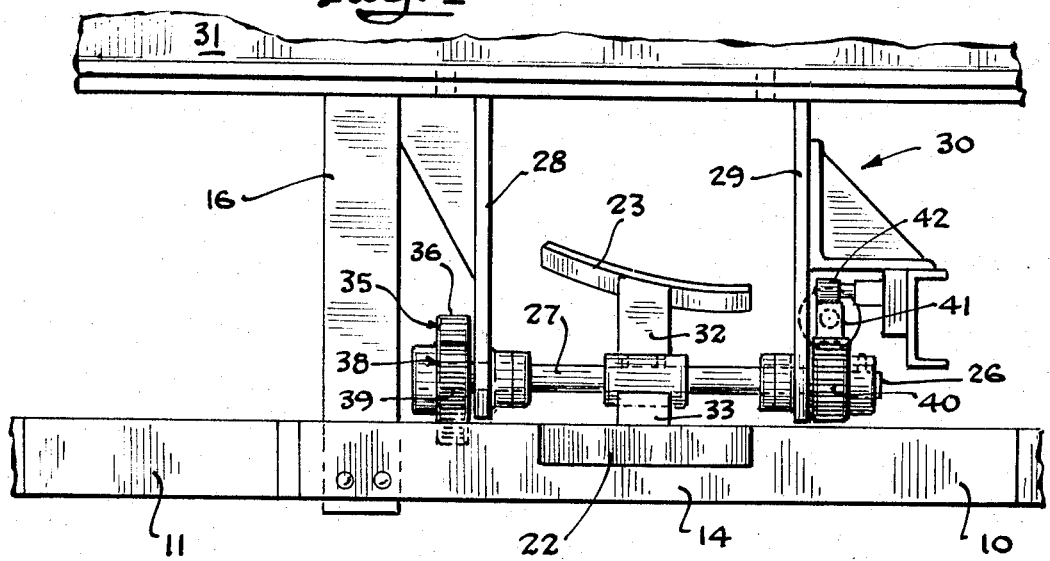

Jan. 30, 1968  J. R. RISTOW  3,366,076
SWITCH FOR TROLLEYS OF OVERHEAD CONVEYOR
Filed Nov. 19, 1965  3 Sheets-Sheet 3

Inventor
John R. Ristow
By Darbo, Robertson & Vandenburgh
Attorneys

United States Patent Office
3,366,076
Patented Jan. 30, 1968

3,366,076
SWITCH FOR TROLLEYS OF OVERHEAD
CONVEYOR
John R. Ristow, Oaklawn, Ill., assignor to St. John & Co.,
Chicago, Ill., a corporation of Illinois
Filed Nov. 19, 1965, Ser. No. 508,805
5 Claims. (Cl. 104—101)

ABSTRACT OF THE DISCLOSURE

A power operated track switch for overhead trolley type conveyor is provided wherein there are two shafts positioned side by side and at one side of and above the rails of the conveyor. These shafts are in juxtaposition to the movable track sections which are employed interchangeably to direct the movement of the trolley from one rail alternatively to a second or third rail. One track section is connected to one shaft and the other track section connected to the other shaft. The two shafts are interconnected by gears, one of which has a substantial portion of its periphery with the teeth missing, another gear on that shaft is engaged by a rack to rotate that shaft and to the extent that there is an engagement between the teeth of the first two gears, to rotate the second shaft. The missing teeth cause a lost motion operation so that during a portion of its movement the first shaft rotates without rotating the second shaft.

The present invention relates to an improvement in the operating mechanism of a switch for an overhead conveyor of the type having a rail upon which trolleys or the like are supported, and the following disclosure thereof is offered for public dissemination upon the grant of a patent therefor.

For many years one standard form of overhead conveyor comprised suitably supported rails which formed a track way for wheeled carriers such as those referred to as trolleys. These have been used, for example, in slaughterhouses for transporting carcasses or portions thereof. These rails often have had branches which turned off from the main rail. Various forms of switches have been employed at the point at which the branch turned off from the main rail so that any particular trolley could selectively either continue on along the main rail or be shunted off onto the branch.

Historically, the trolleys and the load suspended therefrom were moved along the rails manually. However, in the effort to mechanize operations and reduce processing costs, there has been an increasing use in recent years of some form of power-driven apparatus to move the trolleys along the rail. One common form of such power-driven apparatus is an endless belt or chain driven by power about a closed path. At least a portion of that path is parallel to a rail. The apparatus is provided with means for engaging the trolleys so as to move the trolleys along the rail as the chain or belt traverses said portion of its path. A conventional type of such apparatus has side fingers extending transversally under the rail to contact the trolleys and push them along.

At least one style of the conventionally employed rail switches has an operating mechanism which is at one side of the rail and at approximately the same level as the rail. This style of switch is generally incompatible with the commonly used endless pusher apparatus, since the position of the operating mechanism intersects the path in which the endless apparatus must be positioned. While changes perhaps could be made in the endless apparatus or in the physical dimensions of the trolleys to permit a positioning of the endless apparatus so that it would not intersect the position of the switch-operating mechanism, this is generally regarded as impractical from an operational and cost point of view, particularly when an existing plant is being updated. Those working in the art have not conceived of a solution to modifying the switch-operating apparatus to eliminate the conflict. The principle object of the present invention is to provide a switch-operating apparatus which solves this problem.

Another important advantage of the present invention is that embodiments of the invention are ideally suited for automatic control power operation. The switches presently in common use are manually operated. This means that, even though the trolleys are automatically conveyed, an operator must be present at any switch at which it is desired to divert the trolley onto a branch track from the main track. While it is conceivable that these commercially available switches could be power-operated, it is not particularly convenient to do so because of head room and other space limitations. Such problems are not present with embodiments of the present invention. In fact, with embodiments of the present invention, a power actuator can assume innumerable varied positions to adapt to the space limitations at a particular location. The disclosed embodiment of the invention employs an air cylinder, since compressed air normally is readily available in an abattoir. However, it will be apparent to those skilled in the art that variously powered actuators could be substituted therefor.

Further objects and advantages of the invention will be apparent from the following description taken in conjunction with the drawings in which:

FIGURE 1 is a side elevation of an installed embodiment of the invention;

FIGURE 2 is a perspective view of the principal components of the embodiment of FIGURE 1;

FIGURE 3 is a view similar to FIGURE 1 but with the switch in the opposite position;

FIGURE 4 is a front elevation as viewed at line 4—4 of FIGURE 1 and line 4—4 of FIGURE 5.

Figure 5:
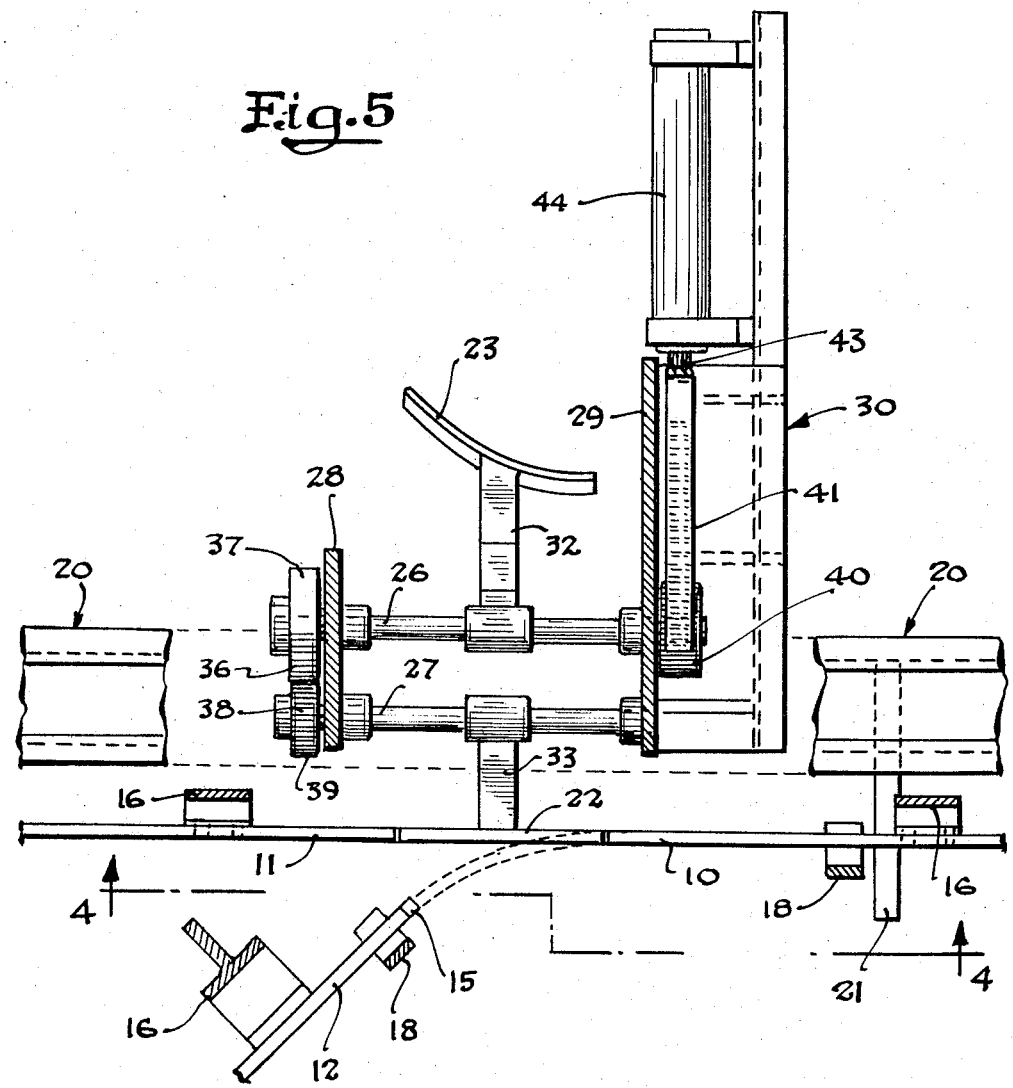
FIGURE 5 is a plan view with portions broken away.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

While the positioning of switches in an overhead trolley conveyor may take a number of forms, the illustrated embodiment shows an installation in which there is a first straight rail 10 from which the trolleys may proceed onto a second straight rail 11 or onto a branch rail 12. From the following description those skilled in the art will appreciate how the invention could be utilized with other rail and switch arrangements. In the illustrated embodiment rails 10 and 11 are formed as a single unit having an opening 13 above a connecting portion 14. The end of rail 12 has a notch forming a ledge 15. The rails are supported from suitable overhead structure (e.g., beam 31) by hangers 16. The trolleys have a wheel 17 which rides on the top of the rails and a strap frame 18 from which the load is carried by hooks 19 or other suitable supports.

A power-driven endless conveyor generally 20 has projecting side fingers 21. As the side fingers 21 move along behind one of the trolleys, they will contact the trolley frame 18 and push the trolley along the rail. This movement takes place from right to left as viewed in FIGURES 2, 4 and 5. If the trolley is to move from straight rail 10 to straight rail 11, an insert 22 is positioned in opening 13, as illustrated in FIGURES 1, 4 and 5. However, if the trolley is to be diverted onto branch rail 12, an insert 23 is alternatively positioned from opening 13 to the notch defined by ledge 15. Insert 23 is supported by connecting portion 14 and ledge 15. Insert 22 is supported by its resting on connecting portion 14.

The mechanism for alternately positioning inserts 22 or 23 into place in the track includes a pair of shafts 26 and 27 suitably journaled in bearings on side plates 28 and 29. Side plates 28 and 29 comprise a portion of a frame 30 which is suspended from an overhead support such as I-beam 31. A bracket 32 has a hub affixed to shaft 26. The distal end of bracket 32 is affixed to rail insert 23. Similarly, rail insert 22 is secured to the distal end of a bracket 33 whose hub is attached to shaft 27.

A gear 35 is affixed to shaft 26. Gear 35 has one section with teeth 36 and a second section 37 that is without teeth. A second gear 38 having teeth 39 is affixed to shaft 27. In the illustrated embodiment the size of the gears is such that were gear 35 to have teeth completely about its periphery, it would have twice as many teeth as gear 38. Also affixed to shaft 26 is a gear 40 having teeth engaged by the teeth on a rack 41. On the top side, rack 41 is backed by rollers 42. Rack 41 is affixed to the piston rod 43 of an air cylinder 44. Suitable controls (not shown) are provided to supply air under pressure alternatively to the two ends of air cylinder 44.

Starting from the position illustrated in FIGURES 1, 4 and 5, air is applied to the rear end of cylinder 44 driving piston rod 43 and rack 41 to the right in FIGURE 1. Shaft 26 rotates in a clockwise direction. Initially, gear teeth 36 engage gear teeth 39 to rotate gear 38 and shaft 27 in a counterclockwise direction. After shaft 27 has rotated approximately 150° from the position illustrated in FIGURE 1, the portion 37 of gear 35, which portion has no teeth, comes into juxtaposition with gear 38. At this point, shaft 27, bracket 33 and insert 22 are approximately in the position illustrated in FIGURE 3. From this point on, there is no engagement between gears 35 and 38. Thus, while gear 35 continues to rotate in a clockwise direction, the rotation of gear 38 and shaft 27 stops.

The continued rotation of shaft 26 thereafter moves that shaft, bracket 32 and insert 23 to the FIGURE 3 position. With insert 22 removed from between track sections 10 and 11 and insert 23 inserted between track sections 10 and 12, the trolley will move out onto track section 12. During this movement, the trolley frame 18 will clear side finger 21 of the endless conveyor 20. However, the momentum of the trolley will be such that the trolley will move onto track section 12. From its position on track section 12, the trolley may remain stationary, may be moved further by hand or moved further by another endless conveyor having similar side fingers.

To return the twitch to a position at which the trolleys will move from straight section 10 to straight section 11, air is applied to the inner end of cylinder 44 moving its piston rod 43 and rack 41 to the left as viewed in FIGURE 3. This rotates shaft 26, bracket 32 and insert 23 in the counterclockwise direction. During the initial portion of that rotation, there is no rotation of shaft 27. During a subsequent portion of the rotation of shaft 26, teeth 36 come into engagement with teeth 39 so that gear 38 and shaft 27 then commence rotating in a clockwise direction. At the finish of the movement, the apparatus has returned to the position illustrated in FIGURE 1.

It will be noted in FIGURE 1 that shafts 26 and 27 lie in a plane that is substantially above the plane defined by the tops of rail sections 10, 11 and 12. Thus, there is adequate room along the side of rail sections 10 and 11 for the installation of conveyor 20 in the conventional manner. In the foregoing description, it was pointed out how a substantial part of the rotation of shaft 26 (the shaft farthest from the rail) takes place at a time during which shaft 27 is stationary. This factor permits the installation of a switch-operating mechanism in the raised position without resulting in interference between the insert brackets, the inserts and adjacent parts.

I claim:
1. In a switch mechanism for operating the switch of an overhead conveyor having a first and a second rail which meet a third rail with track inserts separable from the rails and alternatively employed to connect the third rail with the first rail or with the second rail, said rails having their tops in a common plane and each of said inserts, when in connecting position, having a top in said plane, with said mechanism being employed to alternatively position said inserts in connecting position and including a pair of parallel, rotatable shafts positioned at the side of the first and third rails opposite the side thereof adjacent the second rail with a first of the shafts being between the second shaft and said rails, a bracket interconnecting one insert and one shaft, a bracket interconnecting the other insert and the other shaft, said brackets being aligned to move the respective insert from the respective connecting position to a respective displaced position as the respective shaft is rotated, and means connected to the shafts to rotate the shafts, the improvement comprising: said shafts being substantially above said plane, and said means rotating said second shaft through a greater arc than the arc through which the first shaft is rotated as the inserts are moved between their respective connecting and displaced positions.

2. In a mechanism as set forth in claim 1, wherein said means includes a first gear attached to the first shaft and having gear teeth thereon, a second gear attached to the second shaft and having gear teeth thereon, said teeth on the second gear extending over only a portion of the periphery of the second gear with the teeth on the remainder of the periphery of the second gear being missing, said gears being so positioned that the teeth of the two gears are in engagement when the insert attached to the first shaft is in connecting position and when the insert attached to the second shaft is in connecting position, the teeth of the first gear are in juxtaposition to a portion of said remainder of the periphery of the second gear, and a switch operator operatively connected to said second shaft.

3. In a mechanism as set forth in claim 2, wherein said second gear has a substantially greater diameter than that of said first gear.

4. In a mechanism as set forth in claim 2, wherein said operator includes a fluid-operated cylinder operatively connected to said second shaft to rotate said second shaft.

5. In a mechanism as set forth in claim 4, wherein said operator includes a rack moved linearly by said cylinder and a gear on said second shaft and engaging said rack.

References Cited

UNITED STATES PATENTS 1,453,024   4/1923   Ryon    104—102
2,725,017  11/1955  Bedford et al.   104—130 X

FOREIGN PATENTS 101,385   10/1925   Austria.

ARTHUR L. LA POINT, *Primary Examiner.*

J. E. BABER, *Examiner.*